(12) United States Patent
Klaiber

(10) Patent No.: US 11,926,215 B2
(45) Date of Patent: Mar. 12, 2024

(54) OPERATING ELEMENT FOR OPERATING AN ENTERTAINMENT SYSTEM OF A MOTOR VEHICLE

(71) Applicant: Dr. Ing. h.c. F. Porsche Aktiengesellschaft, Stuttgart (DE)

(72) Inventor: Dominik Klaiber, Neuhausen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 23 days.

(21) Appl. No.: 17/846,178

(22) Filed: Jun. 22, 2022

(65) Prior Publication Data
US 2022/0410713 A1 Dec. 29, 2022

(51) Int. Cl.
*B60K 37/06* (2006.01)
*B60H 1/00* (2006.01)
*B60K 23/00* (2006.01)
*B60R 16/027* (2006.01)

(52) U.S. Cl.
CPC ............ *B60K 37/06* (2013.01); *B60R 16/027* (2013.01); *B60H 1/0065* (2013.01); *B60K 23/00* (2013.01); *B60K 2370/128* (2019.05); *B60K 2370/131* (2019.05); *B60K 2370/1438* (2019.05); *B60K 2370/164* (2019.05); *B60K 2370/172* (2019.05)

(58) Field of Classification Search
CPC .. B60K 37/06; B60K 23/00; B60K 2370/128; B60K 2370/131; B60K 2370/1438; B60K 2370/164; B60K 2370/172; B60K 2005/006; B60K 2370/135; B60R 16/027; B60H 1/0065
See application file for complete search history.

(56) References Cited

U.S. PATENT DOCUMENTS

| | | | |
|---|---|---|---|
| 2005/0148376 A1* | 7/2005 | Kucera | A63F 13/00 463/1 |
| 2022/0097525 A1* | 3/2022 | Myers | G06F 3/0412 |
| 2022/0236840 A1* | 7/2022 | Kim | G06F 3/0482 |
| 2023/0049900 A1* | 2/2023 | Yasuda | G06F 3/0488 |
| 2023/0059417 A1* | 2/2023 | Moon | B60W 10/20 |
| 2023/0093845 A1* | 3/2023 | Conigliaro | B60K 35/00 340/438 |
| 2023/0097073 A1* | 3/2023 | Hamabe | B60K 37/06 345/681 |
| 2023/0140082 A1* | 5/2023 | Fribus | B60R 16/037 74/484 R |
| 2023/0159080 A1* | 5/2023 | Anti | G06F 3/017 200/61.54 |
| 2023/0185523 A1* | 6/2023 | Lee | G10L 15/22 715/708 |

FOREIGN PATENT DOCUMENTS

| | | |
|---|---|---|
| DE | 102009008728 A1 | 10/2009 |
| DE | 102013114794 A1 | 4/2015 |
| DE | 102017004725 A1 | 11/2018 |

* cited by examiner

*Primary Examiner* — Paul N Dickson
*Assistant Examiner* — Shams Dhanani
(74) *Attorney, Agent, or Firm* — Buchanan Ingersoll & Rooney PC

(57) ABSTRACT

An operating element for operating an entertainment system for a motor vehicle, having an interface to a media playback unit and at least one panelling element for a vehicle compartment panelling. The operating element is an element of the panelling element. The operating element is configured for an entertainment system and is able to be stowed easily in a motor vehicle.

16 Claims, 3 Drawing Sheets

OPERATING ELEMENT FOR OPERATING AN ENTERTAINMENT SYSTEM OF A MOTOR VEHICLE

CROSS-REFERENCE TO RELATED APPLICATION

This application claims priority to German Patent Application No. 10 2021 116 211.4, filed Jun. 23, 2022, the content of such application being incorporated by reference herein in its entirety.

FIELD OF THE INVENTION

The invention relates to an operating element for operating an entertainment system for a motor vehicle, to an entertainment system having such an operating element for a motor vehicle, and to a motor vehicle having such an entertainment system.

SUMMARY OF THE INVENTION

Entertainment systems are becoming increasingly important in automotive construction and now already have a large market share with very good growth prospects in the entertainment industry. In addition, with an increase in private transport and congestion associated therewith, more and more people are spending more time in a motor vehicle and do not wish to pass up their entertainment there either. Therefore, entertainment systems, as are known for example from US 2005/148376 A1, are called for in a motor vehicle. For example, separately purchased entertainment systems or components thereof (such as games consoles or multimedia players or controllers) are used in the motor vehicle. These separate entertainment systems or the controllers thereof are usually wired, not made in the design of the motor vehicle and/or require a separate stowing option in the motor vehicle.

The features of the claims may be combined in any technically meaningful manner, it also being possible to take into consideration for this purpose the explanations from the following description and features from the figures, which encompass additional configurations of the invention.

The invention relates to an operating element for operating an entertainment system for a motor vehicle, having at least the following components:
  an interface to a media playback unit; and
  at least one panelling element for a vehicle compartment panelling.

The operating element is especially wherein the operating element is an element of the panelling element.

Ordinal numbers used in the description above and below, where not explicitly indicated to the contrary, serve merely for clear distinction and do not reflect any order or priority of the designated components. An ordinal number greater than one does not require that the presence of a further such component is absolutely necessary.

The operating element proposed here is set up for an entertainment system, with the entertainment system being set up to entertain vehicle occupants in a motor vehicle. In this case, in one embodiment, use of the entertainment system is set up by means of an operating element only for the rear area (or the rear vehicle occupants) of a motor vehicle, only for the front-seat passenger or only for the driver. In one preferred embodiment, one entertainment system is provided for multiple vehicle occupants and/or multiple entertainment systems are provided, with these preferably being able to interact with one another by means of a plurality of operating elements. In this case, the operation for the front area is set up in a manner restricted for the vehicle driver, except when the motor vehicle is in a parked state, whereas the front-seat passenger has full access to the operation of the entertainment system. The vehicle driver is enabled to fully access all functions of the entertainment system outside of and/or within an alternative parked state, for example in the case of an autonomously driveable motor vehicle or a motor vehicle in a parked state.

The operating element comprises at least one interface, with the interface being set up in such a way that communication with a media playback unit is made possible. In one embodiment, the interface is a wired connection from the operating element to the media playback unit. For example, the operating element is connected to the media playback unit via the interface by means of a data cable. A wired interface is for example a standardized USB plug (Universal Serial Bus) or HDMI plug (High Definition Multimedia Interface). In one preferred embodiment, the operating element is connected to the media playback unit by means of a wireless interface. A wireless interface is formed for example by means of an antenna for a PAN (Personal Area Network) or WLAN (Wireless Local Area Network). In one preferred embodiment, the operating element and/or the media playback unit is able to move freely in the motor vehicle.

An entertainment system of this type comprises a media playback unit, for example at least one external screen and/or a video projector which outputs the visual signals for the vehicle occupant, and/or at least one audio playback unit, for example a loudspeaker. In one embodiment, the media playback unit is a conventional entertainment system of a motor vehicle or is integrated therein. In one embodiment, the media playback unit is a mobile terminal (for example a smart phone) which is used as a screen and/or audio playback unit by the media playback unit of the entertainment system. The mobile terminal is able to be positioned in a motor vehicle by means of a holder and is able to be connected to the operating element via the interface by means of a wireless connection. In an alternative or additional embodiment, the entertainment system is integrated into a conventional communication system of a motor vehicle. For example, modern navigation systems are implemented with high-resolution screens in a motor vehicle and/or audio systems are present in a motor vehicle and suitable as media playback unit or are able to be used concomitantly by an entertainment system (possibly optionally).

In one preferred embodiment, the entertainment system and/or the media playback unit thereof is set up for a respective place or vehicle seat of a motor vehicle and the operating element is arranged in a correspondingly assigned manner. In one preferred embodiment, a plurality of entertainment systems and/or media playback units are able to be communicatively connected to one another in such a way that interaction between the vehicle occupants is made possible by means of the operating element or the plurality of operating elements. For example, images or information are able to be shared from one vehicle occupant to another vehicle occupant and/or multiplayer games are able to be played with one another. As an alternative or in addition, separate use of the media playback unit is possible. An option for separate access to the entertainment system or to the media playback unit via an operating interface in addition to the operating element is possible from one place (for example vehicle seat, preferably from the driver and/or front-seat passenger), with the result that access rights can be restricted and/or media playback can be set, for example an audio drama can be selected. In one embodiment, the additional operating interface is likewise an operating element according to the above description, but with the access to the media playback unit of another place in the motor vehicle being made possible.

This operating element then has a higher priority for the access to the media playback unit of the other operating element, for example.

The operating element is integrated into at least one panelling element of a vehicle compartment panelling in such a way that the operating element is stowed well at least in the unused state, preferably corresponds to a conventional panelling element and therefore is unobtrusive in the stowed state. In one embodiment, the panelling element is formed at least partly by what is known as an intelligent textile or comprises contact zones which generate a signal as a result of contact with skin, moisture, heat and/or pressure, with individual regions preferably being assigned a signal, that is to say forming clearly delimited buttons. The zones are marked for example with colors or using a symbol.

It is preferably not necessary to decrease the size of the vehicle interior for the provision of the operating element; the installation space requirement is at least negligible. For example, the operating element comprises at least one (preferably ergonomically arranged) button which is integrated into the surface of the relevant panelling element. For example, the operating element can be used to operate the volume control and/or the playback order on the media playback unit and/or in one preferred embodiment to realize interaction between several media playback units. In one embodiment, the operating element is a controller for a game like in a games console. The number and/or type of buttons then corresponds to a conventional controller.

In one advantageous embodiment of the operating element, it is also proposed that the operating element is connected to the panelling element in a:
    fixed;
    stowable; or
    removable
manner.

In order to operate the entertainment system, the operating element is connected to the panelling element in such a way that in one embodiment it is connected to the panelling element in a fixed manner. In this embodiment, the operating element is embodied as an integral part of the panelling element. For example, the operating element is arranged so that it can be reached comfortably from a conventional sitting position of a passenger and thus simplifies the operation of the entertainment system.

As an alternative or in addition, the operating element is connected to the panelling element in such a way that it is able to be stowed in the panelling element. That is to say, in a retracted state, said operating element is positioned fully and/or partly in a materially bonded manner to the panelling element and, in an extended state, it projects out of the panelling element in a spatial direction such that an increase in the degrees of freedom and/or a more ergonomic position or different positions is/are provided for a vehicle occupant in order to operate the operating element. In one embodiment, the operating element is able to move about a pivot axis between a stowed position and a use position. The movement of the operating element is made possible for example by hand, by means of an actuator and/or by means of a spring mechanism. In one embodiment, the operating element is able to be used as operating element exclusively in a non-stowed state. As an alternative, the operating element is also able to be used in the stowed state. In yet another embodiment, the functionality of the operating element is dependent on the position. For example, a purely conventional function can be executed by the operating element in the stowed state, for example window lifting and/or mirror adjustment.

In an alternative embodiment, the operating element is able to be fully removed from the panelling element. In this embodiment, the operating element is designed to be able to be taken out of the panelling element in such a way that for a vehicle occupant the operating element is able to operated in a conventional sitting position and operating position (as are known for example in games consoles). In this embodiment, the operating element is preferably designed in a wireless manner and having an electrical accumulator (also referred to as battery) in such a way that a power supply of the operating element is ensured. In one preferred embodiment, a contact point is arranged at at least one of the separation points between the operating element and the panelling element, such that the operating element can be (re)charged in a stowed state.

It should be noted that, in all embodiments, operation of the entertainment system is made possible by means of the operating element by means of wired or wireless connection. It should be noted that, in one preferred embodiment, the operating element comprises several components, with each of the components particularly preferably being connected in a removable, stowable or fixed manner independently of the other components. For example, what is known as a joystick is able to fold out and buttons for window lifting are fixed locally and additionally able to be used concomitantly for the operating element of the entertainment system.

Furthermore, in one advantageous embodiment of the operating element, it is proposed that the operating element comprises at least one of the following elements:
    a joystick;
    a button or a keypad; and
    a touchscreen.

In order to ensure multidimensional operability of the entertainment system, an operating element is proposed here which comprises at least one joystick; in this case, a joystick enables operation of the entertainment system in multiple degrees of freedom, with the joystick being designed as an element of the operating element. The joystick is set up for example to operate the entertainment system in such a way that interaction with a further operating element and the media playback unit is also ensured.

In an alternative or additional embodiment, the operating element comprises at least one button and/or a keypad, with the button and/or the keypad being designed in such a way that they are set up to operate the entertainment system. In one embodiment, the buttons of the operating element are arranged in such a way that they are arranged or are able to be arranged ergonomically for a vehicle occupant. The buttons and/or the keypad of the operating element are/is set up for example to operate the entertainment system in such a way that interaction with a further operating element and the media playback unit is also ensured.

Furthermore, it is proposed here that the operating element comprises a touchscreen. In this case, the touchscreen is set up for example to operate the entertainment system in such a way that interaction with a further operating element and the media playback unit is also ensured. In one embodiment, the touchscreen is undertaken by a mobile terminal, that is to say as an external component of the entertainment system additionally undertakes a conventional function of the operating element. The functions of the touchscreen supplement or replace functions of an operating element.

Furthermore, in one advantageous embodiment of the operating element, it is proposed that the operating element likewise performs at least one of the following functions:
operation of traffic functional means;
operation of a transmission circuit;
window lifting;
mirror adjustment;
ventilation adjustment;
volume control;
setting of a vehicle mode.

In one preferred embodiment, the buttons and/or the keypad and the joystick and the touchscreen of the operating element described above are also set up, in addition to the function for operating the entertainment system, to operate a traffic functional means (for example a navigation unit). In one embodiment, the joystick is formed by a shift lever and for example is able to be used to operate the entertainment system exclusively during a parked state. The buttons and/or the keypad and the joystick and/or the touchscreen are also set up to change the window height, the orientation of side mirrors, the ventilation setting, the volume control and/or the setting of a vehicle mode (for example sport or cruise), to move the top in the case of a cabriolet. In addition to operating the entertainment system and the interaction of several operating elements, conventional functions of a motor vehicle are thus also able to be operated by means of the operating element. For example, the elements of the operating element or of the operating elements are a component of the motor vehicle that is conventionally already included. For example, such an element is a lever for lifting windows or a tilt button for an exterior mirror.

Furthermore, in one advantageous embodiment of the operating element, it is proposed that the panelling element comprises at least one of the following elements of a motor vehicle:
a door handle;
a door interior panelling;
a footwell panelling;
a central console for a cockpit;
a vehicle seat; and
a vehicle roof lining of a vehicle interior.

The vehicle compartment panelling encloses the vehicle interior of a motor vehicle and partly, preferably completely, covers the body structure, cables, tubes, airbags and other components of a motor vehicle. In this case, depending on the area of the motor vehicle, the vehicle compartment panelling is divided into several elements and comprises a plurality of panelling elements. A panelling element is for example one of the aforementioned elements. The door handle is for example an element set up to pivot a vehicle door by hand and often already ergonomically set up as an armrest with a handle for a vehicle occupant. For example, at least one pedal is integrated into the footwell panelling, in the manner of a joystick with a volume extent or in the manner of a button as touch element.

The cockpit of a motor vehicle is able to be divided into two areas in the driving direction, a driver-side and a front-seat passenger side, with the cockpit being divided by means of a central console. The central console is thus arranged between the vehicle seat of the vehicle driver and of the front-seat passenger, with the central console being formed or covered by a panelling element. The vehicle interior is closed to the top by means of a vehicle roof lining, with the vehicle roof lining also being formed by a panelling element.

According to a further aspect, an entertainment system for a motor vehicle is provided, having at least the following components:
an operating element according to one embodiment according to the above description for operating the entertainment system; and
a media playback unit which is communicatively connected to the operating element by means of the interface and which is set up to play back entertainment content in a visual and/or auditory manner.

The entertainment system proposed here is a system set up to entertain vehicle occupants in a motor vehicle. In this case, in order to operate the entertainment system an operating element is proposed which in one embodiment is set up only for the rear area (or the rear vehicle occupants) of a motor vehicle, only for the front-seat passenger or only for the driver.

The entertainment system comprises at least one media playback unit, for example at least one external screen and/or a video projector which outputs the visual signals for the vehicle occupant, and/or at least one audio playback unit, for example a loudspeaker. In one embodiment, the media playback unit is a conventional entertainment system of a motor vehicle or is integrated therein. In one embodiment, the media playback unit is a mobile terminal (for example a smart phone) which is used as a screen and/or playback unit by the media playback unit of the entertainment system. In one preferred embodiment, the entertainment system and/or the media playback unit thereof is set up for a respective place or vehicle seat of a motor vehicle. In one preferred embodiment, a plurality of entertainment systems and/or media playback units are able to be communicatively connected to one another in such a way that interaction between the vehicle occupants is made possible by means of the entertainment system. In this case, the plurality of entertainment systems and/or media playback units is connected to operating elements by means of the interface in such a way that the operating elements can operate the media playback units. For example, images or information are able to be shared from one vehicle occupant to another vehicle occupant and/or multiplayer games are able to be played with one another. In addition, the media playback unit or a plurality of media playback units is/are set up to play back entertainment content in a visual and/or auditory manner. As an alternative or in addition, separate use of the media playback unit is possible. An option for access to the entertainment system or to the media playback unit is preferably possible from one place (for example vehicle seat, preferably from the driver and/or front-seat passenger), with the result that access rights can be restricted and/or media playback can be set, for example an audio drama can be selected.

For example, the operating element can be used to operate the volume control and/or the playback order on the media playback unit and/or in one preferred embodiment to realize interaction between several media playback units. In one embodiment, the operating element is a controller for a game like in a games console. The number and/or type of buttons then corresponds to a conventional controller.

Reference is optionally made to the preceding and following description relating to the operating element, provided features of an entertainment system are mentioned there.

In one embodiment, a mobile terminal forms an obligatory component of the entertainment system, with the mobile terminal performing at least one of the following functions:

visual playback;
audio playback;
login (unlocking and/or verification by the user of the mobile terminal);
computation unit.

For example, the entertainment system is set up in such a way that the vehicle occupant can continue their game, their music or their audio drama (for example seamlessly) in the motor vehicle. The mobile terminal is able to be connected to the entertainment system in a wired and/or wireless manner or is part of the entertainment system.

Furthermore, in one advantageous embodiment of the entertainment system, it is proposed that a further operating element which is integrated into a steering means of the motor vehicle is provided.

At least one steering means (for example a steering wheel or control stick) is provided on the driver side of a conventional motor vehicle for controlling the motor vehicle, with a second operating element being integrated into the steering means of the motor vehicle in one embodiment. In this case, the second operating element is likewise set up to operate the entertainment system. The second operating element likewise comprises an interface. A media playback unit is able to be operated by the second operating element by means of the interface. In one embodiment, a (single) media playback unit is communicatively connected both to at least one (first) operating element as an element of a panelling element and to a (second) operating element (steering means).

In one advantageous embodiment, the second operating element is able to be used exclusively in a parked state or is able to be used to operate the entertainment system in a driving state only to a restricted extent. In the state in which the steering means are used for the entertainment system, the vehicle control is decoupled from the steering means. In a fully automatic motor vehicle, the steering means are able to be used continuously, with the vehicle control being able to be undertaken again by the driver or another vehicle occupant using the steering means by means of a simple command.

According to a further aspect, a motor vehicle is proposed, having at least one propulsion wheel, a torque-generating drive machine for propulsion of the motor vehicle by means of the at least one propulsion wheel, a gear mechanism which transmits the torque of the drive machine to the at least one propulsion wheel, and a steering means for controlling the motor vehicle,
with at least one entertainment system according to one embodiment according to the above description also being included.

In this case, a motor vehicle comprising a drive machine by means of which a torque is able to be generated is now proposed. The torque of the drive machine is able to be transmitted to at least one propulsion wheel by means of a gear mechanism. The at least one propulsion wheel is set up for propulsion of the motor vehicle. The motor vehicle is able to be controlled by means of a steering means. In this case, the motor vehicle has a vehicle compartment panelling which clads the vehicle interior, preferably in an optically attractive manner. The vehicle compartment panelling comprises panelling elements which, in addition to their conventional function in a motor vehicle, are also elements of an operating element.

BRIEF DESCRIPTION OF THE DRAWINGS

The above-described invention will be discussed in detail below against the relevant technical background with reference to the associated drawings, which show preferred refinements. The invention is not in any way restricted by the purely schematic drawings, and it should be noted that the drawings are not to scale and are not suitable for defining size ratios. In the drawings.

DETAILED DESCRIPTION OF THE INVENTION

Figure 1:
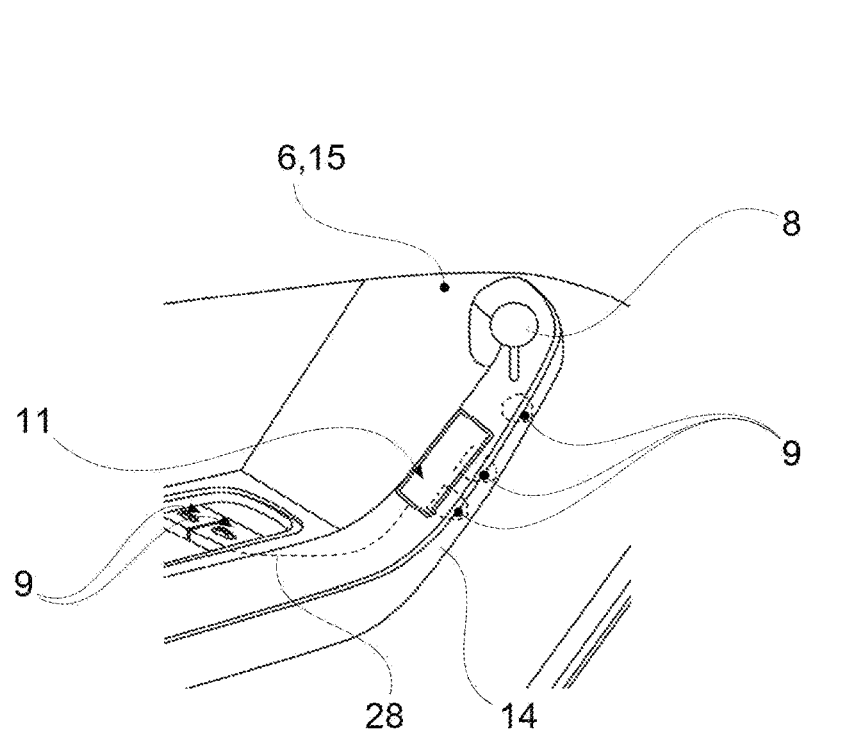
FIG. 1: shows a first operating element fixed in a panelling element.

FIG. 1 shows a first operating element 1 fixedly integrated into a panelling element 6. The panelling element 6 is in this case, according to the illustration, a door interior panelling 15 having a door handle 14, with the door handle 14 comprising the first operating element 1. In this embodiment, the first operating element 1 is fixedly connected to the door handle 14 and comprises (each of the mentioned elements purely optionally) a joystick 8 which is mounted on the door handle 14 so as to be movable in several degrees of freedom, a plurality (in this case optionally three) of ergonomically arranged buttons 9 for operating using fingertips, and a touchscreen 11. In this case, these elements of the first operating element 1 are set up in such a way that an entertainment system 2 (other components are not pictured here, cf. FIG. 5 in this respect) is able to be operated. In this case, a data cable 28 is (purely optionally) connected to an interface 4, not shown here. The interface 4 is set up to transmit entertainment content, for example playback order and/or volume control, to a media playback unit 5. The data cable 28 is for example able to be integrated in a manner neutral in terms of structural space, for example in addition or as an alternative to a signal cable of one (or more) button(s) 9 for window lifting.

Figure 2:
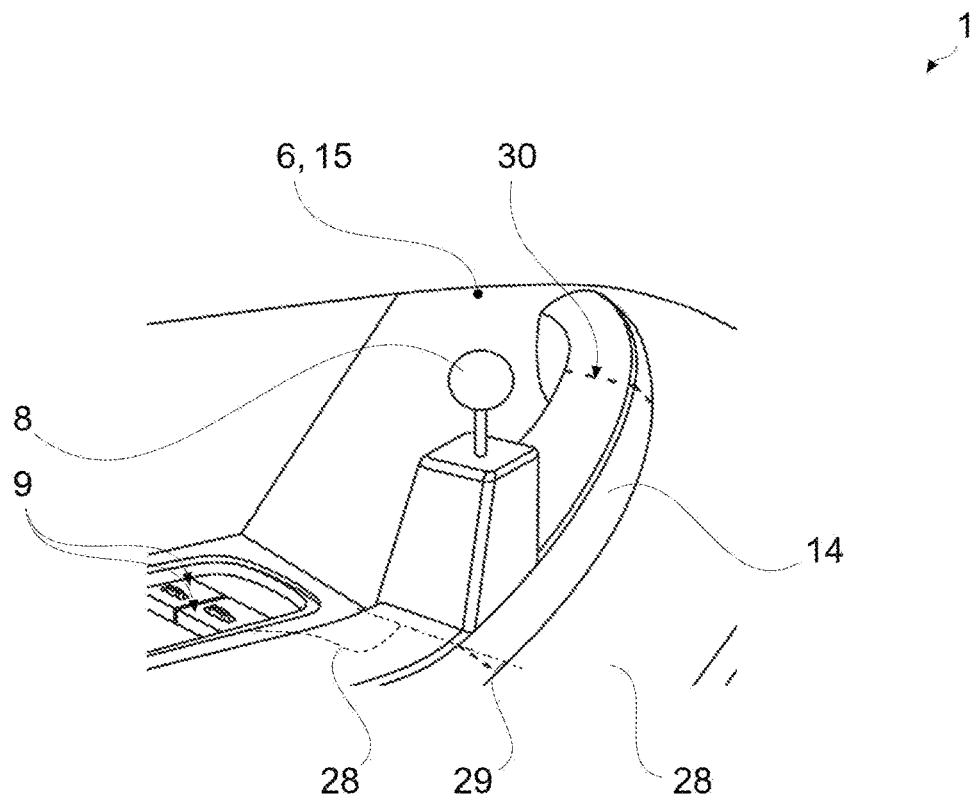
FIG. 2: shows a first operating element in a stowable embodiment.

FIG. 2 shows a first operating element 1 in a stowable embodiment. In this case, the first operating element 1 is arranged in a panelling element 6, in this case a door handle 14 of a door interior panelling 15. In this embodiment, the first operating element 1 comprises a joystick 8 which is mounted so as to be able to pivot about a pivot axis 29 out of the door handle 14 of the door interior panelling 15 toward the passenger for example by means of a click mechanism. In this case, the joystick 8 of the first operating element 1 is able to be released out of the door interior panelling 15 at a separation point 30. In this embodiment, the joystick 8 is set up to operate an entertainment system 2 (cf. FIG. 5), not shown here. The joystick 8 of the first operating element 1 is able to be stowed in the door handle 14 outside of the use time in such a way that the interior is tidy. For example, there is a stowing reminder via optical and/or acoustic signal and/or locking or even starting the vehicle when the first operating element 1 is not stowed is prevented.

Figure 3:
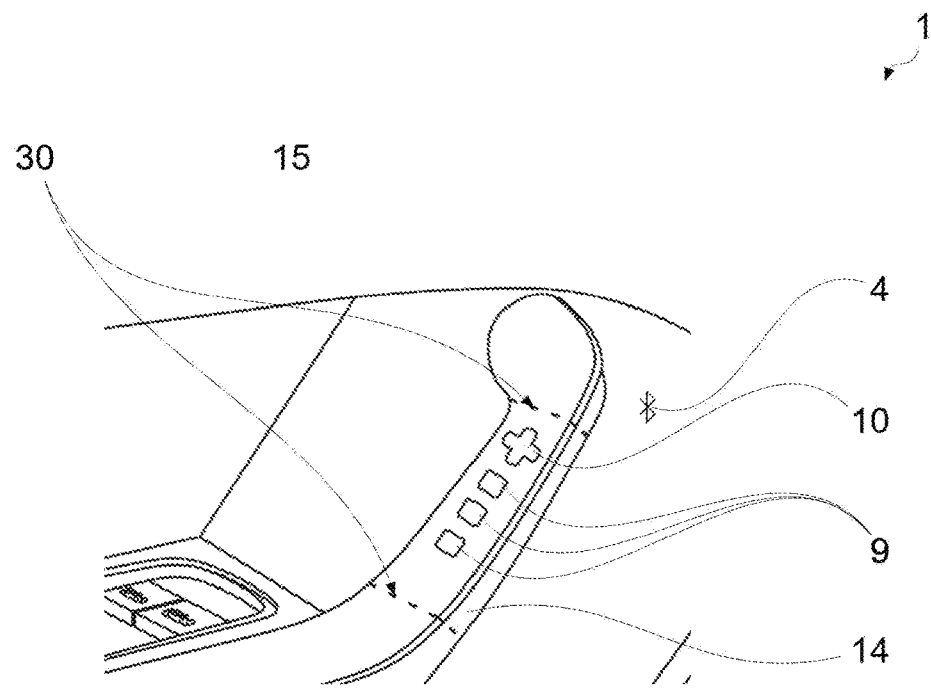
FIG. 3: shows a first operating element in a removable embodiment.

FIG. 3 shows a first operating element 1 in a removable embodiment. In this case, the first operating element 1 is arranged in a panelling element 6, in this case a door handle 14 of a door interior panelling 15. The first operating element 1 comprises a keypad 10 comprising a plurality of buttons 9 which are set up to operate an entertainment system 2 by means of an (in this case purely optionally wireless) interface 4. The first operating element 1 is arranged in the door handle 14 in such a way that the first operating element 1, according to the illustration, is able to be removed from the door handle 14 at separation points 30 (marked here) to the side of the keypad 10. The first operating element 1 is able to be introduced into the door handle 14 for example by means of a click mechanism and an accumulator of the first operating element 1 is able to be (re)charged by means of the separation point contacts in the case of a wireless embodiment.

Figure 4:
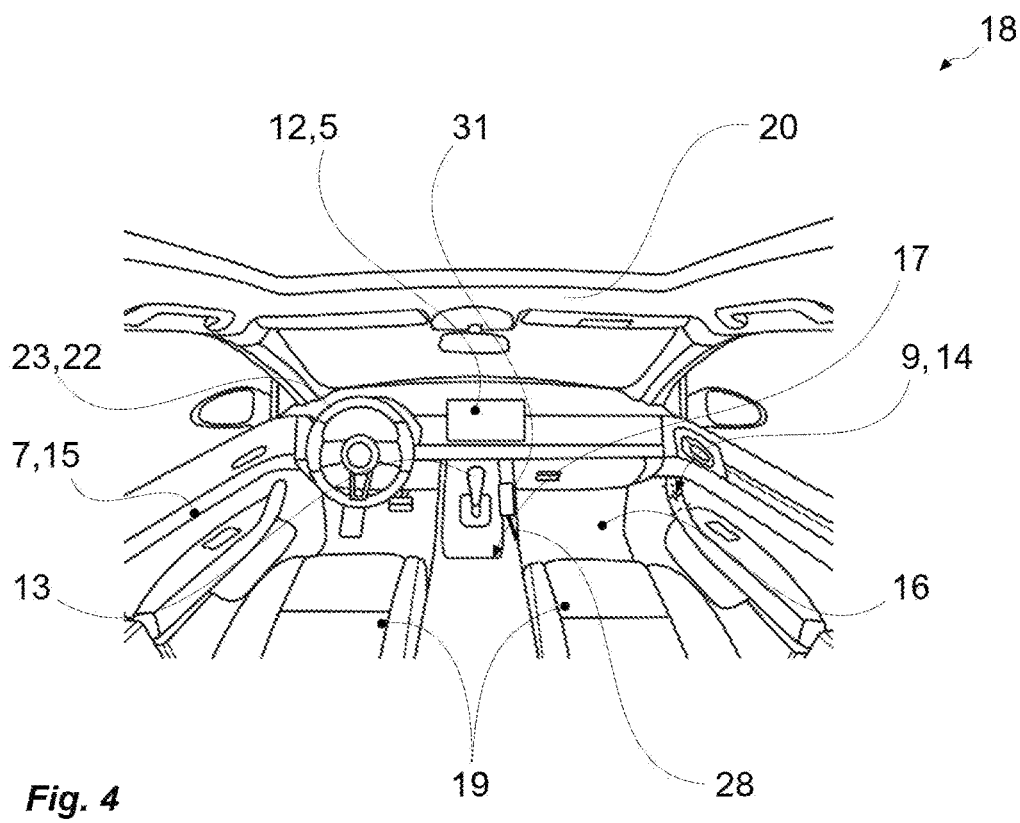
FIG. 4: shows a cockpit of a motor vehicle with a vehicle compartment panelling.

FIG. 4 shows a cockpit 18 of a motor vehicle 3 comprising a vehicle compartment panelling 7, the cockpit comprising at least one entertainment system 2, for example as shown in one of FIG. 1 to FIG. 3. The vehicle compartment panelling 7 is in this case, according to the illustration, able to be divided into various areas and in this case labeled pars-pro-toto on the door interior panelling 15 of the left (driver) door. Without excluding generality, a part of the vehicle compartment panelling 7 is also formed by a vehicle seat 19, a vehicle roof lining 20, a central console 17, a transmission circuit 13 (or the switching lever thereof), a footwell panelling 16 and a door handle 14. In this exemplary embodiment, the right-hand door interior panelling 15 comprises a door handle 14 comprising a removable first operating element 1 which is set up to operate an entertainment system 2 (cf. FIG. 5). In this exemplary embodiment, the media playback unit 5 is arranged above the central console 17 in the field of view of the driver and/or the front-seat passenger. The central console 17 comprises (for example conventional) buttons 9 which are set up for example to change a vehicle mode and/or to operate a navigation unit. In one embodiment, a further or alternatively a first operating element 1 is arranged on the vehicle roof lining 20, in the footwell panelling 16 and/or in a vehicle seat 19.

In this exemplary embodiment, the cockpit 18 comprises a steering means 23, a transmission circuit 13 for a gear mechanism 27 and a plurality of traffic functional means 12, for example a navigation unit, a turn signal lever and/or a windshield wiper lever. In this case, the steering means 23 function (for example exclusively in a parked state of the motor vehicle 3) as a second operating element 22, just like the transmission circuit 13, the traffic functional means 12 and/or the buttons 9 of the central console 17, with the second operating element 22 being set up to operate the entertainment system 2. At least in an active driving situation (that is to say controlled by the driver), the second operating element 22 is again able to be used exclusively to control the motor vehicle 3. In addition, in this embodiment, the entertainment system 2 comprises a mobile terminal 31 comprising a data cable 28. In this case, the mobile terminal 31 is connected to an interface 4 (not illustrated here) of the first operating element 1 by means of the data cable 28, for example for the front-passenger seat as (mobile) media playback unit 5 and the (first) operating element 1 in the door handle 14 of the front-passenger door.

Figure 5:
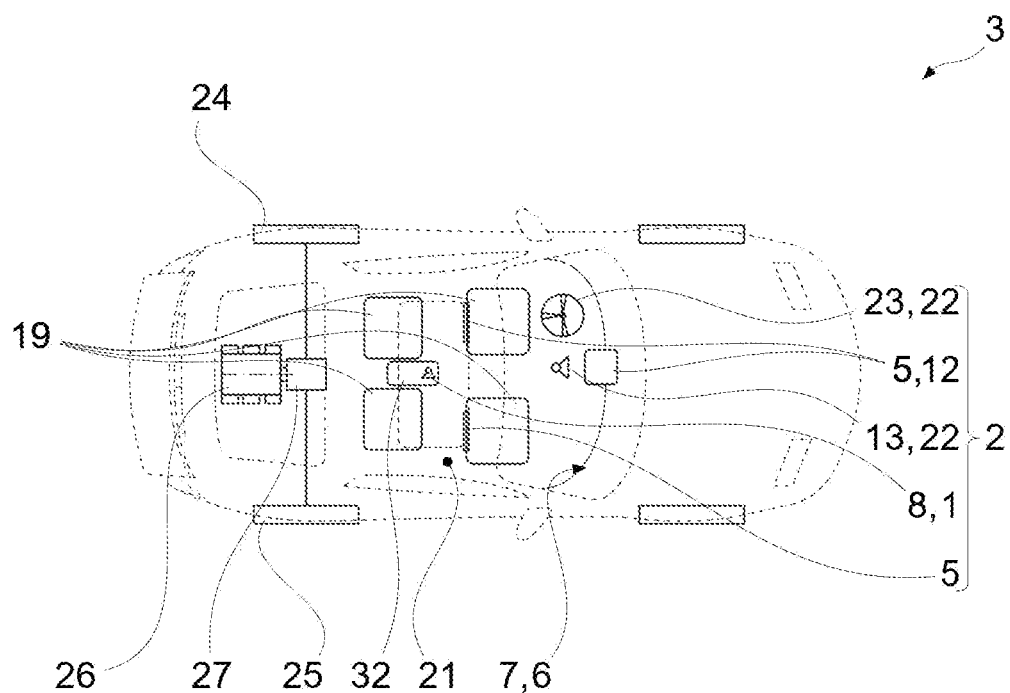
FIG. 5: shows a motor vehicle with an entertainment system.

FIG. 5 shows a motor vehicle 3 comprising an entertainment system 2. The motor vehicle 3 comprises a drive machine 26, in this case illustrated purely optionally as an internal combustion engine, a gear mechanism 27 and a left-hand propulsion wheel 24 and a right-hand propulsion wheel 25. A torque, which can be transmitted to those propulsion wheels 24, 25 set up for propulsion, is able to be generated by means of the drive machine 26.

Furthermore, the motor vehicle 3 comprises a vehicle interior 21 in which vehicle occupants can be seated (in this case on a driver seat, a front-passenger seat and two rear seats). The vehicle interior 21 is clad with a vehicle compartment panelling 7 comprising individual panelling elements 6. At least one first operating element 1 of an entertainment system 2 is integrated into a panelling element 6 of the vehicle compartment panelling 7, in this case shown purely representatively on a joystick 8 in a (preferably stowable) central armrest 32 of the rear (in the main driving direction) vehicle seats 19. In this embodiment, furthermore, the entertainment system 2 comprises a second operating element 22 which is integrated for example into the steering means 23 (in this case a steering wheel) and/or into a transmission circuit 13. Furthermore, provision is made for (purely optionally three) media playback units 5, for example screens on the rear side of the front seats and a screen at the front which is concomitantly used by a navigation unit. Both operating elements 1, 22 are set up to operate separate entertainment systems 2 or a joint entertainment system 2, that is to say assigned to the respective and/or all media playback units 5 (corresponding to the vehicle seat 19).

The operating element proposed here is set up for an entertainment system and is able to be stowed easily in a motor vehicle.

LIST OF REFERENCE DESIGNATIONS

1 First operating element
2 Entertainment system
3 Motor vehicle
4 Interface
5 Media playback unit
6 Panelling element
7 Vehicle compartment panelling
8 Joystick
9 Button
10 Keypad
11 Touchscreen
12 Traffic functional means
13 Transmission circuit
14 Door handle
15 Door interior panelling
16 Footwell panelling
17 Central console
18 Cockpit
19 Vehicle seat
20 Vehicle roof lining
21 Vehicle interior
22 Second operating element
23 Steering means
24 Left-hand propulsion wheel
25 Right-hand propulsion wheel
26 Drive machine
27 Gear mechanism
28 Data cable
29 Pivot axis
30 Separation point
31 Mobile terminal
32 Central armrest

What is claimed is:

1. An operating element for operating an entertainment system of a motor vehicle, said operating element comprising:
an interface to a media playback unit of the entertainment system; and
at least one panelling element of a vehicle compartment panelling, wherein the operating element forms part of the panelling element, the operating element being switchable between a first mode and a second mode, wherein in the first mode of the operating element, the operating element serves as a game controller for a game being played via the entertainment system of the motor vehicle, and, in the second mode of the operating element, the operating element serves for adjusting a functionality of the vehicle unrelated to the entertainment system of the motor vehicle.

2. The operating element as claimed in claim 1, wherein the operating element is connected to the panelling element in a fixed, stowable, or removable manner.

3. The operating element as claimed in claim 1, wherein the operating element comprises a joystick, a button, a keypad, or a touchscreen.

4. The operating element as claimed in claim 1, wherein, in the second mode, the operating element performs at least one of the following functions:
   operation of traffic functional means;
   operation of a transmission circuit;
   window lifting;
   mirror adjustment;
   ventilation adjustment;
   volume control; and
   setting of a vehicle mode.

5. The operating element as claimed in claim 1, wherein the panelling element comprises at least one of the following elements of a motor vehicle:
   a door handle;
   a door interior panelling;
   a footwell panelling;
   a central console of a cockpit;
   a vehicle seat; and
   a vehicle roof lining of a vehicle interior.

6. An entertainment system for a motor vehicle, having at least the following components:
   the operating element as claimed in claim 1 for operating the entertainment system; and
   the media playback unit which is communicatively connected to the operating element by the interface and which is configured to play back entertainment content in a visual and/or auditory manner.

7. The entertainment system as claimed in claim 6, further comprising a further operating element that is integrated into a steering means of the motor vehicle.

8. A motor vehicle, having at least one propulsion wheel, a torque-generating drive machine for propulsion of the motor vehicle by the at least one propulsion wheel, a gear mechanism which transmits the torque of the drive machine to the at least one propulsion wheel, a steering means for controlling the motor vehicle, and the entertainment system as claimed in claim 1.

9. An entertainment system for a motor vehicle, having a plurality of the operating elements as claimed in claim 1 for operating the entertainment system, each operating element being associated with a different occupant of the motor vehicle, and, in the first mode of each operating element, the media playback unit is configured to permit interaction between the different occupants via the operating elements.

10. The operating element as claimed in claim 1, wherein the operating element is integrated and non-removably fixed to the panelling element of the vehicle compartment panelling.

11. The operating element as claimed in claim 1, wherein the operating element is movable relative to the panelling element between a stowed position and a use position.

12. The operating element as claimed in claim 11, wherein the operating element is operable in the first mode when in the use position, and the operating element is operable in the second mode when in the stowed position.

13. The operating element as claimed in claim 11, wherein the operating element is not operable in the second mode when in the use position, and the operating element is not operable in the first mode when in the stowed position.

14. The operating element as claimed in claim 1, wherein the panelling element constitutes an armrest or door handle of the motor vehicle.

15. The operating element as claimed in claim 4, wherein the operating element includes buttons, and, in the second mode, the buttons are configured to perform at least one of said functions, and, in the first mode, the buttons form at least part of the game controller for the game.

16. The operating element as claimed in claim 1, wherein the at least one panelling element is separate from the media playback unit.

* * * * *

UNITED STATES PATENT AND TRADEMARK OFFICE
CERTIFICATE OF CORRECTION

PATENT NO.         : 11,926,215 B2
APPLICATION NO.    : 17/846178
DATED              : March 12, 2024
INVENTOR(S)        : Dominik Klaiber Page 1 of 1

It is certified that error appears in the above-identified patent and that said Letters Patent is hereby corrected as shown below:

On the Title Page

Please add:
(30) Foreign Application Priority Data
June 23, 2021 (DE)........ 10 2021 116 211 4

Signed and Sealed this
Eleventh Day of June, 2024

Katherine Kelly Vidal
*Director of the United States Patent and Trademark Office*